United States Patent
Choe et al.

(10) Patent No.: US 9,318,140 B2
(45) Date of Patent: Apr. 19, 2016

(54) EXCHANGE ENHANCED CAP MANUFACTURED WITH ARGON AND OXYGEN IMPLANTATION

(71) Applicant: HGST Netherlands B.V., Amsterdam (NL)

(72) Inventors: Gunn Choe, San Jose, CA (US); Yoshihiro Ikeda, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 86 days.

(21) Appl. No.: 13/720,969

(22) Filed: Dec. 19, 2012

(65) Prior Publication Data

US 2014/0168817 A1  Jun. 19, 2014

(51) Int. Cl.
G11B 5/66 (2006.01)
G11B 5/62 (2006.01)
G11B 5/84 (2006.01)
G11B 5/65 (2006.01)

(52) U.S. Cl.
CPC .. *G11B 5/62* (2013.01); *G11B 5/65* (2013.01); *G11B 5/656* (2013.01); *G11B 5/66* (2013.01); *G11B 5/84* (2013.01)

(58) Field of Classification Search
None
See application file for complete search history.

(56) References Cited

U.S. PATENT DOCUMENTS

| | | | |
|---|---|---|---|
| 6,641,932 B1 | 11/2003 | Xu et al. | |
| 7,691,499 B2 | 4/2010 | Wu et al. | |
| 8,043,734 B2 | 10/2011 | Harkness, IV et al. | |
| 8,110,298 B1 | 2/2012 | Choe et al. | |
| 8,202,636 B2 | 6/2012 | Choe et al. | |
| 2006/0115686 A1* | 6/2006 | Ataka et al. | 428/831 |
| 2006/0269797 A1* | 11/2006 | Lu et al. | 428/834 |
| 2009/0155627 A1* | 6/2009 | Berger et al. | 428/828 |
| 2009/0161255 A1* | 6/2009 | Maeda | 360/110 |
| 2009/0244777 A1* | 10/2009 | Shimizu et al. | 360/234 |
| 2010/0073813 A1* | 3/2010 | Dai et al. | 360/110 |
| 2010/0209737 A1 | 8/2010 | Bian et al. | |
| 2011/0122525 A1* | 5/2011 | Nemoto et al. | 360/75 |
| 2011/0194207 A1* | 8/2011 | Sato et al. | 360/75 |
| 2013/0146562 A1* | 6/2013 | Guo et al. | 216/22 |

FOREIGN PATENT DOCUMENTS

| | | | |
|---|---|---|---|
| JP | 10050544 A | * | 2/1998 |
| JP | 2009238273 A | | 10/2009 |
| JP | 2010113763 A | | 5/2010 |
| JP | 2011034665 A | | 2/2011 |
| JP | 2011113604 A | | 6/2011 |
| JP | 2011138586 A | | 7/2011 |
| JP | 2012069173 A | | 4/2012 |

(Continued)

OTHER PUBLICATIONS

Abstract Translation of JP 10-050544 A (Published 1998).*

(Continued)

*Primary Examiner* — Kevin Bernatz

(74) *Attorney, Agent, or Firm* — Zilka-Kotab, PC

(57) ABSTRACT

A magnetic media having a novel cap layer that allows the cap layer having improved exchange coupling and reduced thickness. The cap layer is doped with a non-reactive element such as Ar, Kr, Xe, Ne or He preferably Ar. This doping reduces increases exchange coupling and reduces the dead layer, allowing the cap layer to be made thinner for reduced magnetic spacing and improved data recording performance.

10 Claims, 5 Drawing Sheets

(56) References Cited

FOREIGN PATENT DOCUMENTS

| | | |
|---|---|---|
| JP | 2012109005 A | 6/2012 |
| JP | 2012169017 A | 9/2012 |

OTHER PUBLICATIONS

Choe et al., "Perpendicular Recording CoPtCrO Composite Media With Performance Enhancement Capping Layer," IEEE Transactions on Magnetics, vol. 41, No. 10, Oct. 2005, pp. 3172-3174.

Choe et al., "Control of Exchange Coupling Between Granular Oxide and Highly Exchange Coupled Cap Layers and the Effect on Perpendicular Magnetic Switching and Recording Characteristics," IEEE Transactions on Magnetics, vol. 45, No. 6, Jun. 2009, pp. 2694-2700.

Choe et al., "Switching Behavior and Writeability in Perpendicular Magnetic Dual Oxide Media With Capping Layer," IEEE Transactions on Magnetics, vol. 46, No. 6, Jun. 2010, pp. 1802-1805.

Zhang et al., "Effects of Exchange Coupling Between Cap Layer and Oxide Layer on the Recording Performance in Perpendicular Media," Journal of Applied Physics, vol. 105, No. 7, Proceedings of the 53rd Annual Conference on Magnetism and Magnetic Materials, Magnetic Recording, Heads and Media, 2009, pp. 07B710-1-07B710-3.

* cited by examiner

|  | OW (dB) | 2TSNR (dB) | 2TSoNR (dB) | 747MCW (nm) | BER | BER af | Res (%) | Touch down power (mW) |
|---|---|---|---|---|---|---|---|---|
| No Ar doped cap | 35.7 | 19.1 | 27.7 | 82 | -5 | -4.8 | 37.4 | 78.3 |
| With Ar doped cap | 38.5 | 19.8 | 27.7 | 63.7 | -5.5 | -5.1 | 39.7 | 80.4 |

FIG. 5

EXCHANGE ENHANCED CAP MANUFACTURED WITH ARGON AND OXYGEN IMPLANTATION

FIELD OF THE INVENTION

The present invention relates to magnetic data recording and more particularly to a magnetic media having a novel capping layer having a novel exchange coupling layer manufactured by argon and oxygen implantation.

BACKGROUND OF THE INVENTION

A key component of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). When the slider rides on the air bearing, the write and read heads are employed for writing magnetic impressions to and reading magnetic impressions from the rotating disk. The read and write heads are connected to processing circuitry that operates according to a computer program to implement the writing and reading functions.

Perpendicular magnetic recording has become the standard for magnetic data recording. Such recording systems use a magnetic media having high magnetic anisotropy grains. Often a capping layer is applied over the high magnetic anisotropy grains, followed by a protective overcoat such as carbon. The cap layer provides a strong in-plain magnetic coupling between the magnetic grains. This cap layer improves the writeability and thermal stability of the media, enabling writing to the high magnetic anisotropy grains under the cap layer. The cap layer also improves the surface roughness and corrosion robustness.

However currently available cap layers present challenges. Since the cap layer is deposited on top of the well separated oxide grains, the initial growth layer of the cap up to 2 nm is also well separated and does not provide enough exchange coupling between grains. This initial 2 nm of the cap layer has been referred to as the dead layer, because the cap layer growth is separated in this region. The magnetic coercivity Hc of the media goes up in this dead region, then starts to go down with more exchange coupling as the thickness of the cap layer increases. For this reason cap layers have had to be at 4 nm thick or thicker to get sufficient exchange coupling. A thicker cap increases the spacing between the head and the high magnetic anisotropy grains as well as spacing between the head and the soft magnetic under-layer of the media, which decreases performance of the disk drive system. This increased spacing decreases the resolution of the media and is not suitable for future high density magnetic recording.

One approach that has been proposed to overcome this challenge is to use a higher saturation magnetization (Ms) alloy for the cap layer. Such media can provide better exchange coupling with thinner total cap thickness, but this type of cap layer also increases the coupling between the cap and thin oxide layer that forms a non-magnetic boundary between magnetic grains. Stronger coupling between the cap and the oxide layer reduces the write assist effectiveness of the capping layer, so that such systems do not work well.

SUMMARY OF THE INVENTION

The present invention provides a magnetic media that includes a magnetic recording layer, and a cap layer formed over the magnetic recording layer. At least a portion of the cap layer is doped with a non-reactive element.

The cap layer can be doped with Ar, Kr, Xe, Ne or He, but is preferably doped with Ar. This forms an upper portion of the cap layer that is doped.

The doping of the cap layer advantageously improves the exchange coupling of the cap layer and reduces or eliminates the dead layer of such a cap layer. This allows the cap layer to be significantly thinner than would otherwise be possible, thereby reducing the magnetic spacing for improved performance of the data recording system.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 5 is a table illustrating the performance gain provided by the use of the Ar doped capping layer.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
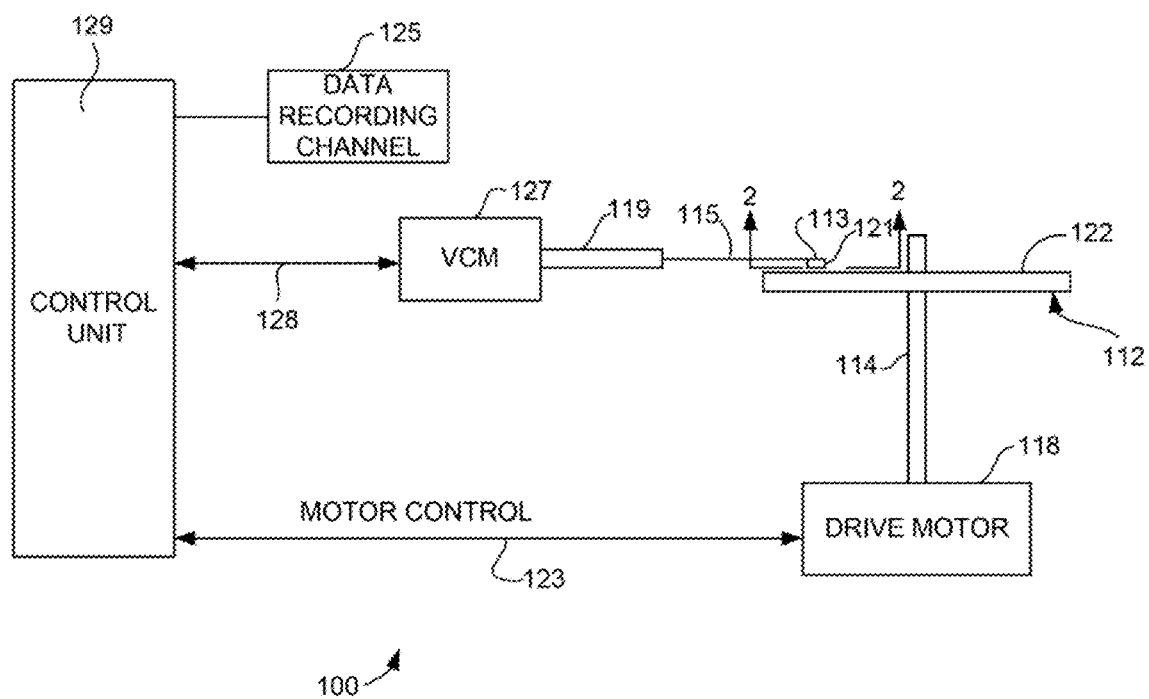
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data racks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
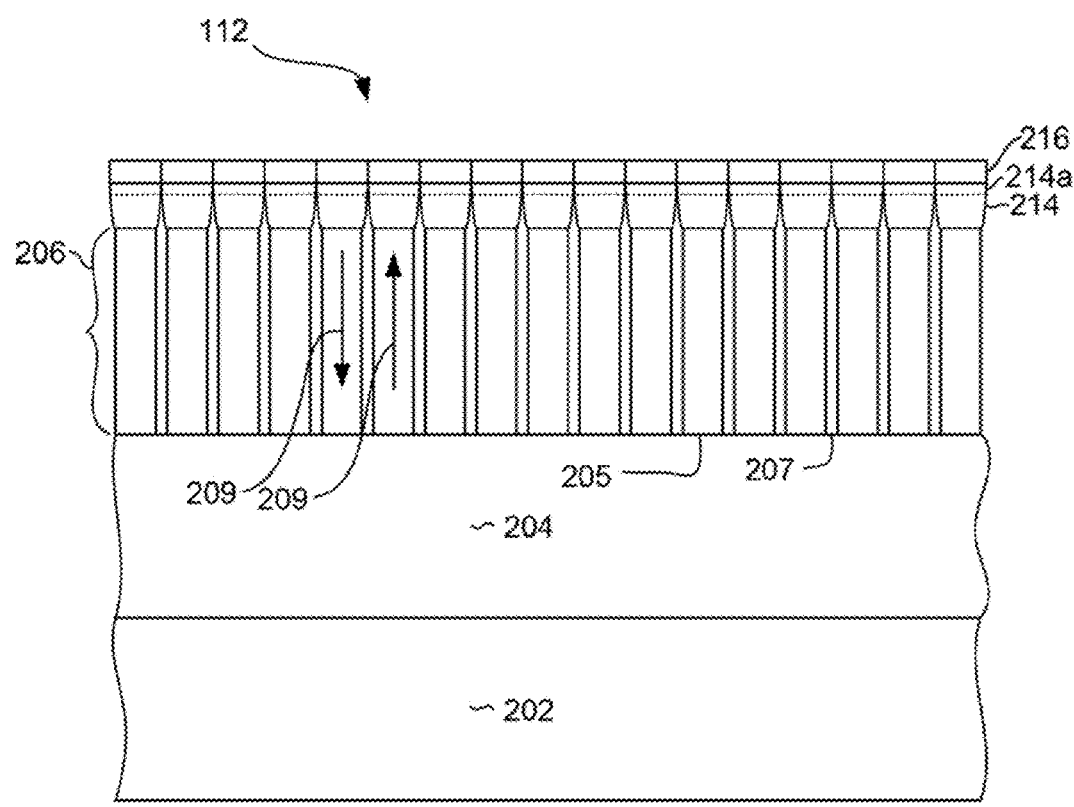
FIG. 2 is an enlarged, cross sectional view of a portion of a magnetic media according to an embodiment of the invention.

FIG. 2 is an enlarged, cross-sectional view of a portion of a magnetic disk according to an embodiment of the invention. The magnetic disk 112 includes a substrate 202, a soft magnetic under-layer 204 and a high magnetic anisotropy magnetic recording layer 206 formed over the soft magnetic layer 204. A cap layer 214 is formed over the recording layer 206, and a hard protective coating such as carbon 216 is formed over the cap layer to protect the under-lying layers from damage such as from physical contact or corrosion.

The magnetic recording layer structure 206 is formed as a plurality of grains 205 that are preferably separated from one another by non-magnetic oxide boundaries 207 The grains 205 are preferably long in the direction perpendicular to the surface of the media (e.g. in a vertical direction in FIG. 2), and narrow in a direction parallel with the surface of the media 112 (e.g. in a horizontal direction in FIG. 2). This grain shape provides a shape induced magnetic anisotropy that helps to maintain the magnetic stability of recorded grains. When a magnetic bit is recorded to the media, the magnetization of the magnetic grain 205 is aligned in a direction either up or down as indicated by arrows 209 in FIG. 2.

The magnetic grains 205 of the recording layer 206 can be a material such as an ordered L10 Fe—P, chosen for its high magnetic anisotropy and moderately high Curie temperature Tc. The magnetic grains 205 can include other structures as well. For example in a thermally assisted recording system, the grains 205 of the recording layer 206 can include an exchange coupling layer within the grain (not shown) which helps to maintain thermal stability of the grain at normal operating temperature, but which allows the magnetization of the grains 205 to be switched at elevated temperatures during recording.

The cap layer 214 can be constructed of a highly exchange coupled magnetic alloy which may be an alloy containing Co, Cr and Pt. More particularly, the cap layer 214 can be a Co—Cr—Pt alloy having 50 to 80 atomic percent Co, 10 to 20 atomic percent Cr and 10 to 20 atomic percent Pt. The cap layer 214 may also include small amounts of one or more of B, Ta, Ru, W and Ti. The cap layer 214 has an upper portion 214a that is doped with atoms of a non-reactive gas such as Ar, Kr, Xe, Ne or He. Preferably, the upper layer 214a is doped with Ar, or alternatively Ar and O. This doping of the upper layer 214a improves exchange coupling, allowing a thinner cap layer to be used while still providing the desired in plane magnetic coupling between grains 205 of the recording layer 206 for improved writeability and stability of the media 112. The upper doped portion 214a of the cap layer 214 can have a thickness of 0.1-2 nm, which provides desired magnetic spacing between the magnetic head and the recording layer 206 and under-layer 204.

Figure 3:
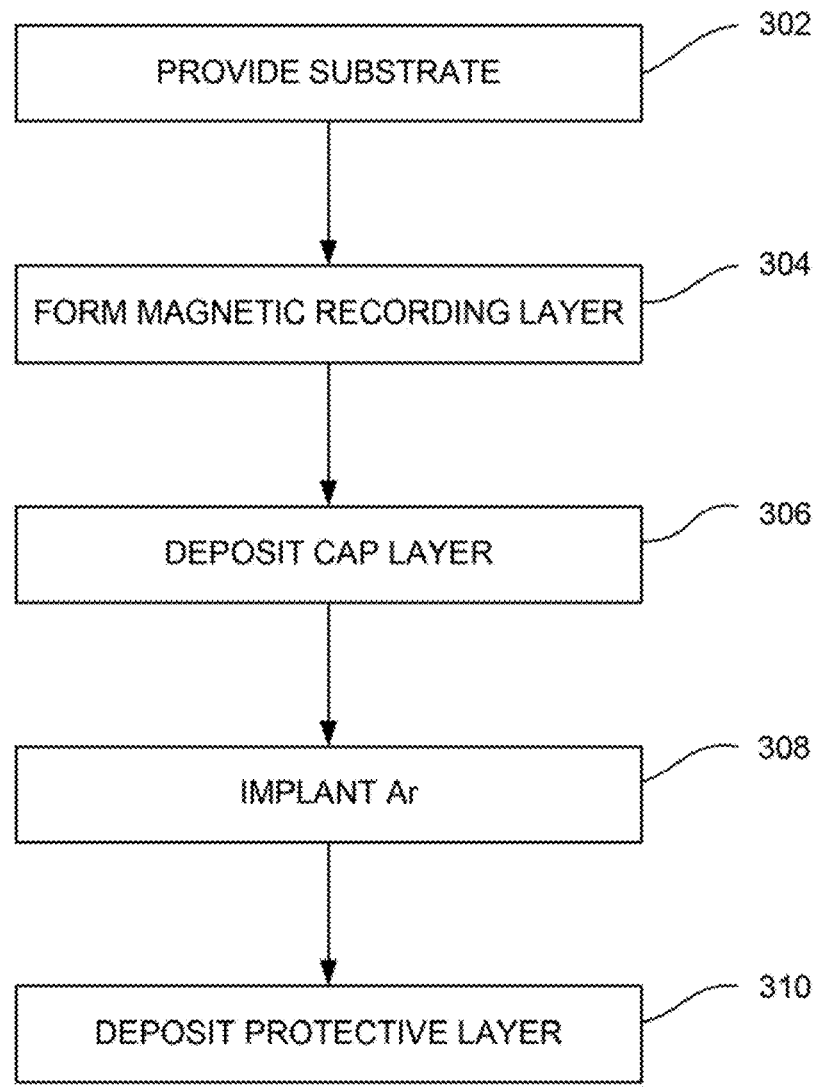
FIG. 3 is a flowchart illustrating a method of manufacturing a magnetic media according to an embodiment of the invention.

The doped cap layer 214 can be manufactured by a novel method that dopes the desired atoms into the cap layer without etching away any significant amount of the cap layer. This method is illustrated with reference to FIG. 3 which is a flow chart summarizing a method for manufacturing the cap layer of a magnetic media according to an embodiment of the invention. In a step 302, a substrate is provided with a soft magnetic layer formed thereover. Then, in a step 304 a magnetic recording layer is formed over the substrate and soft magnetic layer. The magnetic recording layer is preferably formed as a plurality of vertically grown magnetic grains that may be separated by thin oxide layers. Then, in a step 306 a capping layer can be deposited by magnetron sputter deposition and can be deposited to a thickness of about 35 Angstroms (i.e. 3.5 nm). The capping layer can be less than 5 nm and is more preferably less than 4 nm. In a step 308, the deposited cap layer is doped with atoms of as non-reactive gas, such as Ar, Kr, Xe, Ne or He. The substrate and deposited cap layer are placed in an ion beam deposition chamber or chemical vapor deposition chamber, preferably without breaking vacuum. A non-reactive gas, preferably Ar gas or a combination of Ar gas and oxygen gas, is entered into the chamber, and as radio frequency power is applied at a low power, preferably less than 1 keV, to implant the non-reactive element into the cap layer. This implantation process can be performed for a duration of 0.2 seconds. Then, in step 310 the non-reactive gas is pumped out of the chamber and acetylene gas is introduced into the chamber, and a protective overcoat (preferably carbon) is deposited over the cap layer. The carbon overcoat deposition can be performed in a different chamber than that in which the non-reactive gas implantation was performed.

The above process can be performed without the need for additional tooling and without the need for an additional chamber. The doping can be performed using, for example, a conventional chamber used for the deposition of carbon protective overcoat.

Figure 4:
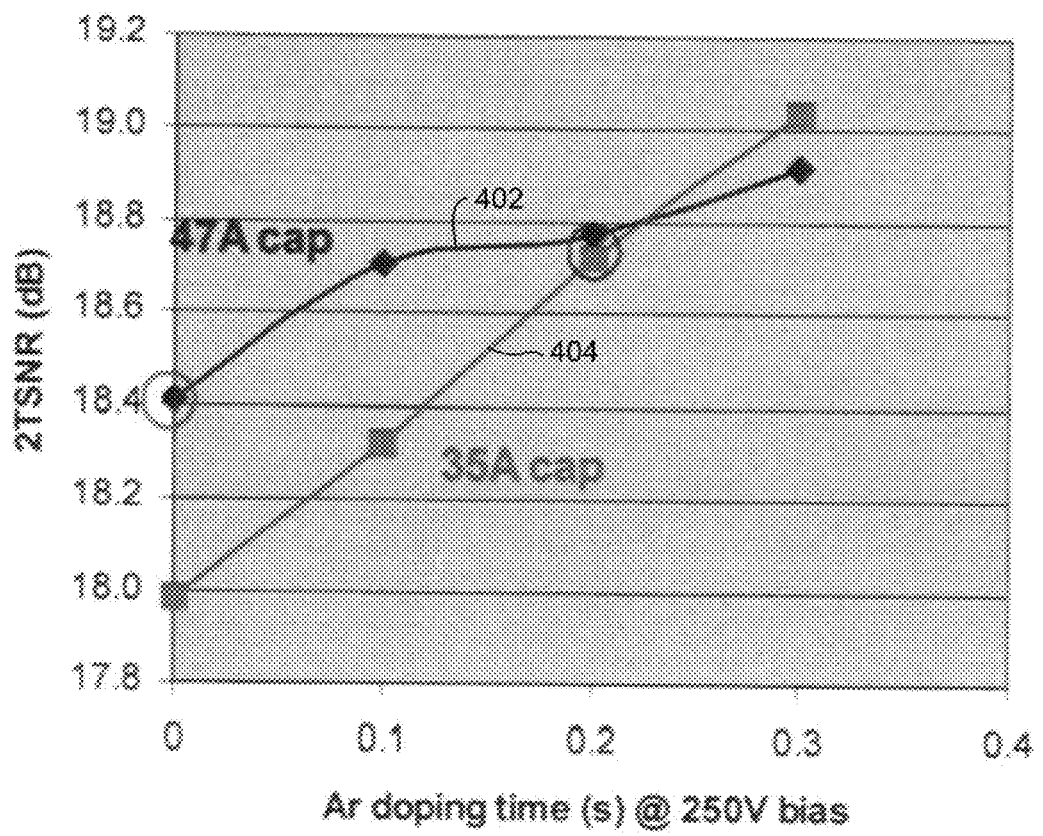
FIG. 4 is a graph of 2 track signal noise ratio as a function of Ar doping time.

The performance benefits realized by the present invention can be seen more clearly with reference to FIG. 4 which shows the relationship between signal to noise ratio 2TSNR (dB) as a function of doping time. The line 402 shows the signal to noise ratio for a 47 Angstrom thick capping layer and line 404 shows the signal to noise ratio for a 35 Angstrom capping layer. As can be seen, by providing the proper amount of doping (e.g. about 0.2 seconds at 25 volt bias) the signal to noise ratio of the 35 Angstrom capping layer can match that of the 47 Angstrom capping layer, and the reduced thickness increases the resolution by reducing magnetic spacing.

FIG. 5 is a table further illustrating the performance gain provided by the Ar doping. The upper row shows the performance for a capping layer with no Ar doping and the bottom row shows the performance with Ar doping. As can be seen, the Ar doping significantly improves performance. For example, with regard to the bit error rate BERaf, a more negative BERaf number correlates with improved performance. The implementation of Ar doping in the capping layer results in −0.3 improvement in BERaf, which is a very significant improvement in bit error rate.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic media, comprising:
   a magnetic recording layer; and
   a magnetic cap layer formed over the magnetic recording layer, the magnetic cap layer comprising a first portion and a second portion each comprising Co, Cr and Pt, the first and second portions being coextensive with each other and being arranged such that the first portion is between the magnetic recording layer and the second portion and wherein only the second portion is substantially uniformly doped with a non-reactive element selected from the group consisting of Ar, Kr, Xe, Ne, He or combinations thereof.

2. The magnetic media as in claim 1, wherein the second portion of the magnetic cap layer is doped with Ar.

3. The magnetic media as in claim 1, wherein the second portion of the magnetic cap layer is doped with Ar and also with oxygen.

4. The magnetic media as in claim 1, wherein the magnetic cap layer has a thickness less than 5 nm.

5. The magnetic media as in claim 1, wherein the second portion of the magnetic cap layer has a thickness of 0.1 to 2 nm.

6. The magnetic media as in claim 1, wherein the magnetic cap layer comprises an exchange coupled magnetic alloy.

7. The magnetic media as in claim 1, wherein the magnetic cap layer comprises a Co—Cr—Pt alloy having 50 to 80 atomic percent Co, 10 to 20 atomic percent Cr and 10 to 20 atomic percent Pt.

8. The magnetic media as in claim 1, wherein the magnetic cap layer comprises a Co—Cr—Pt alloy having 50 to 80 atomic percent Co, 10 to 20 atomic percent Cr and 10 to 20 atomic percent Pt and further includes one or more of B, Ta, Ru, W and Ti.

9. A magnetic data storage system, comprising:
   a housing;
   a magnetic media mounted within the housing, the magnetic media comprising a magnetic recording layer, and a magnetic cap layer formed over the magnetic recording layer, the magnetic cap layer comprising a first portion and a second portion each comprising Co, Cr and Pt, the first and second portions being coextensive with each other and being arranged such that the first portion is between the magnetic recording layer and the second portion and wherein only the second portion is substantially uniformly doped with a non-reactive element selected from the group consisting of Ar, Kr, Xe, Ne, He or combinations thereof;
   an actuator; and
   a slider connected with the actuator for movement adjacent to a surface of the magnetic media.

10. The magnetic data storage system as in claim 9, wherein the second portion of the magnetic cap layer is doped with Ar.

* * * * *